(12) United States Patent
Noyes

(10) Patent No.: US 9,023,279 B2
(45) Date of Patent: May 5, 2015

(54) SELF-CONTAINED ASSAY FACILITY IN AN AIRCRAFT AND METHOD OF USING SAME TO PROCURE AND ASSAY PRECIOUS METALS

(71) Applicant: Chris M. Noyes, Suffolk, VA (US)

(72) Inventor: Chris M. Noyes, Suffolk, VA (US)

(73) Assignee: AOW Holdings, LLC, Chesapeake, VA (US)

( * ) Notice: Subject to any disclaimer, the term of this patent is extended or adjusted under 35 U.S.C. 154(b) by 211 days.

(21) Appl. No.: 13/863,622

(22) Filed: Apr. 16, 2013

(65) Prior Publication Data

US 2015/0032667 A1    Jan. 29, 2015

Related U.S. Application Data

(63) Continuation-in-part of application No. 13/731,163, filed on Dec. 31, 2012, which is a continuation-in-part of application No. 13/364,422, filed on Feb. 2, 2012, now Pat. No. 8,551,402, which is a continuation-in-part of application No. 13/136,811, filed on Aug. 11, 2011, now abandoned, said application No. 13/731,163 is a continuation-in-part of application No. PCT/US2011/066807, filed on Dec. 22, 2011.

(51) Int. Cl.
*G01N 15/06* (2006.01)
*G06Q 50/10* (2012.01)

(52) U.S. Cl.
CPC ...................................... *G06Q 50/10* (2013.01)

(58) Field of Classification Search
USPC ...................... 422/63–65, 68.1, 50, 501–503; 296/24.3
See application file for complete search history.

(56) References Cited

U.S. PATENT DOCUMENTS

| | | | |
|---|---|---|---|
| 1,444,025 A | 2/1923 | Copp | |
| 1,557,431 A | 10/1925 | Davignon | |
| 1,764,057 A | 6/1930 | Steinhauer | |
| 3,497,093 A | 2/1970 | Mardiat, Sr. | |
| 3,697,123 A | 10/1972 | Gygrynuk | |
| 4,462,879 A | 7/1984 | Castellanos et al. | |

(Continued)

FOREIGN PATENT DOCUMENTS

| | | |
|---|---|---|
| KR | 10-2007-0072373 | 7/2007 |
| WO | WO 2013022473 A1 | 2/2013 |

OTHER PUBLICATIONS

Feb. 14, 2013, International Search Report PCT/US2011/066807.

(Continued)

*Primary Examiner* — Jyoti Nagpaul
(74) *Attorney, Agent, or Firm* — Neifeld IP Law, PC

(57) ABSTRACT

A self-contained assay facility housed in a fixed-wing or rotary wing aircraft that is completely equipped to melt and assay precious metals, particularly gold and silver. An induction furnace melts the metal that is then poured into an ingot. The ingot is weighed and analyzed using an XRF alloy analyzer and the percentage of gold and/or other metals recorded. The value of the gold at current market prices is calculated and the assay and the value of the ingot is printed and given to the seller. The seller may opt to receive the ingot and pay the assayer an assay fee. Alternately, the seller may ask to be paid in cash, in bullion, by wire transfer, or by an open hedge. A transfer or hedge is initiated and confirmed from the assay facility. The ingots are securely stored in a safe within the assay facility.

16 Claims, 13 Drawing Sheets

(56) References Cited

U.S. PATENT DOCUMENTS

| | | | |
|---|---|---|---|
| 4,643,476 | A | 2/1987 | Montgerard |
| 6,688,048 | B2 | 2/2004 | Staschik |
| 7,290,817 | B1 | 11/2007 | Delasse |
| 8,329,105 | B1 | 12/2012 | Sweeny et al. |
| 8,551,402 | B1 | 10/2013 | Noyes |
| 2002/0018541 | A1 | 2/2002 | Yagi |
| 2005/0234602 | A1 | 10/2005 | Rigsby |
| 2005/0247162 | A1 | 11/2005 | Bratina |
| 2007/0122350 | A1 | 5/2007 | Pilkiewicz et al. |
| 2007/0189108 | A1 | 8/2007 | Lindblom et al. |
| 2008/0115600 | A1 | 5/2008 | Hageluken et al. |
| 2009/0114168 | A1 | 5/2009 | Lee et al. |
| 2010/0305957 | A1 | 12/2010 | Parsons et al. |
| 2011/0047062 | A1 | 2/2011 | Kerschner et al. |
| 2012/0030097 | A1 | 2/2012 | Hagan et al. |
| 2013/0118948 | A1 | 5/2013 | Noyes |

OTHER PUBLICATIONS

Written Opinion PCT/US2011/066807, mailed Sep. 19, 2012.
May 12, 2006, Northern Refineries, "Northern Refineries—Refining Process of Precious Metals" http://web.archive.org/web/20060512215825/http://www.northernrefineries.com/Refining_Process.htm (May 12, 2006).
Feb. 17, 2010, San Diego Refining Co., "San Diego Refining" http://web.archive.org/web/20100217040549/http://sandiegorefining.com/assaying.html.
Aug. 13, 2013, Gold Refining Forum.com, http://goldrefiningforum.com/~goldrefi/phpBB3/viewtopic.php?f=60&t=10402&start=0, (Aug. 13, 2013).
Office Action mailed Sep. 6, 2013 in related U.S. Appl. No. 13/136,803.
Petition to Accept Unintentionally Delayed Priority Claim filed Nov. 25, 2013 in related U.S. Appl. No. 13/364,422.
Nov. 22, 2013, Petition to Accept Unintentionally Delayed Priority Claim filed Nov. 22, 2013 in related U.S. Appl. No. 13/731,163.
Petition to Accept Unintentionally Delayed Priority Claim filed Nov. 25, 2013 in related U.S. Appl. No. 13/863,622.
Nov. 22, 2013, Declaration of Chris Noyes submitted in O-008-O-010.
Declaration of Amanda Story submitted in O-008-O-010.
PCT International Search Report, PCT/IB2013/061345.
PCT Written Opinion, PCT/IB2013/061345.
PCT International Search Report, PCT/IB2013/061454.
PCT Written Opinion, PCT/IB2013/061454.
Jun. 17, 2007, Mine Safety and Health Admisistration: "Controlling Mercury Hazards in Gold Mining: A Best Practices Toolbox" http://web.archive.org/web/20070617194001/http://www.msha.gov/S&HINFO/MERCURY/HGMAIN.HTM, Jun. 17, 2007.
Jun. 18, 2010, DoItYourself.com: Troubleshooting Your Digital Weight Scale http://web.archive.org/web/20100618044508/http://www.doityourself.com/stry/troubleshooting-your-digital-weight-scale, Jun. 18, 2010.
Nov. 29, 2010, Ullman Devices: "a world's leader and originator in quality specialty tools" http://web.archive.org/web/20101129070506/http://ullman-devices.com/Inspection_Mirrors/HTK-2L T. html Nov. 29, 2010.
Sep. 2010, Yelp.com: "Jewelry Stores and Ring Sizing I Voorhees Township I Yelp" http://www.yelp.com/topic/voorhees-township-jewelerystores-and-ring-sizing Sep. 2010.
Dec. 10, 2014, http://www.oro-industries.com/lab.php; Gold Concentrators—Oro Indistries—The "Martin" Multi-Helix, downloaded Dec. 10, 2014.
Office Action mailed Sep. 11, 2014 in related U.S. Appl. No. 13/136,803.
Office Action mailed Mar. 11, 2014 in related U.S. Appl. No. 13/136,811.

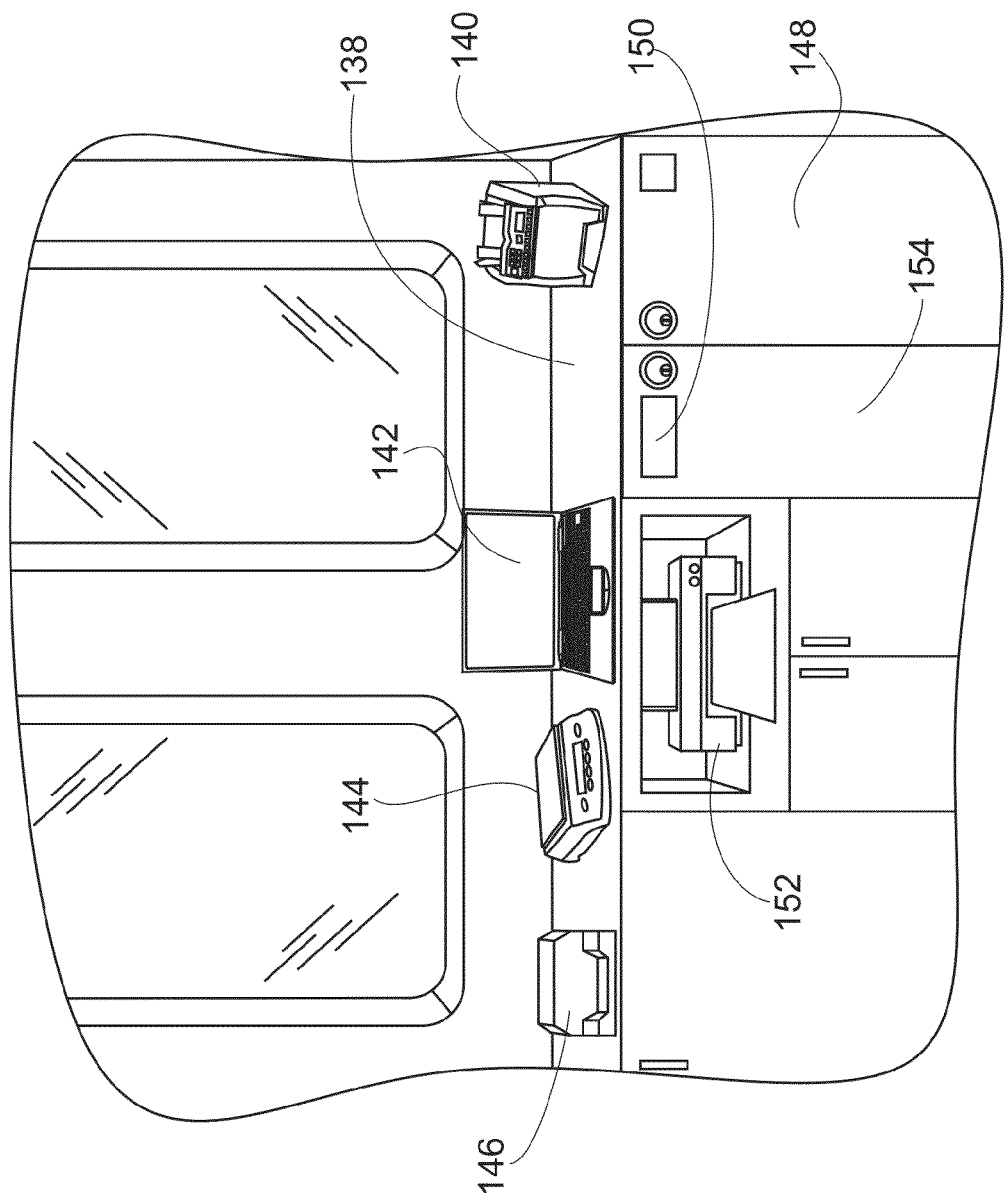

2040 Precious Metals

Time 4.6 sec
RedAu 14K   1.7

| Ele | % | +/−2σ |
|-----|-------|--------|
| Au  | 59.66 | 0.88   |
| Ag  | 6.54  | 0.38   |
| Pd  | nd    | <0.057 |
| Pt  | nd    | <1.21  |
| Zn  | 8.99  | 0.44   |
| Cu  | 24.81 | 0.69   |

[Main]

Fig. 7

290

| | | |
|---|---|---|
| Date: | 11/2/2012 | |
| Customer: | Select One | ▼ |
| Processor: | Select One | ▼ |

*Gold Assay*
Gold Bar 1

| | | | |
|---|---|---|---|
| | X-ray 1 | 0.0000 | |
| | X-ray 2 | 0.0000 | |
| | X-ray 3 | 0.0000 | |
| | X-ray 4 | 0.0000 | |
| | X-ray 5 | 0.0000 | *Formula:* |
| 292 — | % of Pure | 0.00% | (Average of x-ray spots in percent) |
| 294 — | Bar Karat | 0.0 | (Average*24) |
| 296 — | Gram Bar Weight | | (Weight of Bar in Grams) |
| 298 — | Total Ounces of Pure | 0.000 | (% of Pure*Weight/31.1) |
| 300 — | Market Price | | (Current Gold Market Price) |
| 302 — | Total Amount | $0.00 | (Total Ounces*Market Price) |
| | Payout Percentage | Select One ▼ | |
| 304 — | Payout Total | $0.00 | (Total Amount * Percentage) |
| 306 — | Processing Fee | Select One ▼ | (Set fee) |
| 308 — | Shipping Cost | $0.00 | (Total Ounces*$4) |
| 310 — | Customer Payout | $0.00 | (Payout Total-Processing-Shipping) |

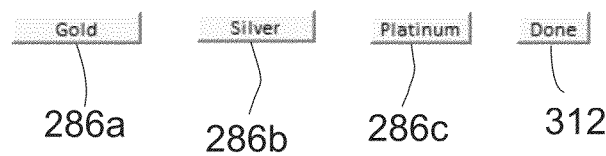

SELF-CONTAINED ASSAY FACILITY IN AN AIRCRAFT AND METHOD OF USING SAME TO PROCURE AND ASSAY PRECIOUS METALS

CROSS REFERENCE TO RELATED APPLICATIONS

This application is a Continuation-in-Part of application Ser. No. 13/731,163, filed Dec. 31, 2012, which is a Continuation-in-Part of application Ser. No. 13/364,422, filed Feb. 2, 2012, now U.S. Pat. No. 8,551,402, issued Oct. 8, 2013, which is a Continuation-in-Part of application Ser. No. 13/136,811, filed Aug. 11, 2011, the contents of each of the preceding applications are incorporated by reference herein in their entirety; and Application Ser. No. 13/731,163, filed Dec. 31, 2012 is a Continuation-in-Part of Application No. PCT/US 2011/066807, filed Dec. 22, 2011, which is a Continuation-in-Part of application Ser. No. 13/136,811, filed Aug. 11, 2011.

FIELD OF THE INVENTION

The invention pertains to facilities for assaying precious metals and, more particularly, to a secure, self-contained assay facility disposed in an aircraft and a method of using the facility to procure, assay, and process gold and other precious metals.

BACKGROUND OF THE INVENTION

The increasing demand for gold and other precious metals for industrial processes, investments, and other uses has caused the market prices for such metals to increase to record levels. The high market price of gold has prompted owners of gold and other precious metals to frequent establishments equipped to purchase these metals. Because metals presented for sale may be from different areas and may be of varying composition, metal buying establishments must either smelt and assay such metals before they can, in turn, sell it to an establishment capable of further processing the metal. As used herein, the term gold will be assumed to include other precious metals such as, but not limited to, silver, platinum, copper, etc.

Such gold or gold alloys may be located in areas not readily serviced by roads making even the transportable, self-contained assay facility of the Ser. No. 13/731,163, hereinafter the '163 application impractical for use in such locations. Therefore, the need exists for an assay facility for use in areas not served by roads and where the transportable, self-contained assay facility of the '163 application cannot be safely delivered to a site by aircraft or a site is not hospitable for any semi-permanent structure. This is particularly true when no semi-permanent facility is justified. Perhaps there is only a single pickup and/or processing of precious metal anticipated. In other circumstances, while there may be multiple precious metal pickups and processing, they are spaced so far apart that a semi-permanent assay facility is not justified.

It would, therefore, be desirable to provide a self-contained assay facility that is completely setup are ready to assay precious metal in an aircraft, either fixed wing or rotary wing, that may be flown to a site and then, flown to a different site upon completion of a precious metal transaction at a first site.

SUMMARY OF THE INVENTION

In accordance with the present invention there is provided a self-contained assay facility and a method of using the self-contained assay facility that is housed in an aircraft. While the aircraft may be a fixed wing aircraft or a rotary wing aircraft (e.g., a helicopter), the ease of landing and taking off in very limited space characteristic of rotary wing aircraft make them the more useful choice. As used hereinafter, the term "helicopter" is used to refer to any variant of rotary wing aircraft.

Commercial rotary wing aircraft having enough space to house a mobile assay facility are well known. It will be recognized that the layout of the mobile assay facility as described and claimed herein may be readily modified to fit within a wide variety of aircraft. Consequentially, the invention is not considered limited to a particular, whether fixed wing or rotary wing aircraft. The invention is intended to include any aircraft having enough interior space to include the assay facility components.

The aircraft is typically portioned into at least three sections in addition to the cockpit and any other aircraft related spaces. These three spaces are a client compartment having access from outside the aircraft, a processing compartment, and a utility compartment.

The utility compartment typically contains a three-phase, diesel powered electrical generator, an exhaust system, a fuel supply tank, and a chiller. It is possible in some aircraft to use power from a generator connected to the aircraft's engine(s). When this is possible, the weight of a three-phase, diesel powered electrical generator, fuel tank, and fuel for the generator may be eliminated.

The processing compartment contains an induction furnace designed to melt precious metals, a quench tank, an accurate scale, typically an analytical balance to weigh precious metals, and X-ray fluorescence (XRF) alloy analyzer to provide an accurate assay of the content of an ingot.

The client compartment allows a client (i.e., a person with precious metal to be assayed) to be seated within the aircraft. A monitor coupled to one or more cameras in the processing compartment is provided. Using this closed circuit monitor the client may clearly observe each step of the process taking place in the processing compartment. This visibility for the client helps instill confidence in the client that the assaying operation is being performed honestly.

In operation, a client with precious metal to sell brings that precious metal or metal bearing ore to the aircraft where it is melted and poured into an ingot. Prior to pouring the ingot, a pin sample of the molten metal may be taken and analyzed using the XRF analyzer. After the ingot is cooled and dried, it is weighed and the exact weight is recorded in a computer. The ingot is then analyzed with the X-ray fluorescence (XRF) analyzer and the XRF analysis of the ingot is then recorded in the computer.

A communications apparatus within the aircraft is used to determine the current price of the precious metal of interest (usually gold) and that price is also entered into the computer. Using the data now in the computer, the value of one or more of the specific precious metals in the ingot is calculated.

The seller (i.e., client) is given several options. He or she may wish to receive the smelted ingot. In this case the seller pays the assayer a fee for the melting and assay and then leaves with the ingot.

If the ingot is retained, it is placed in a safe and the seller may receive payment in the form of cash, a wire transfer, a hedge, check, or physical bullion. Retained ingots are subsequently securely shipped to a processing facility. The exact mode of shipment depends on the location of the aircraft and the access to common carriers such as FedEx® or other such carriers offering secure shipping.

If the seller chooses to receive payment for the ingot as a wire transfer to his or her account, a wire transfer is initiated from within the aircraft. Once a confirmation number is received from the issuing bank, the seller leaves the assay facility. The seller may be given an opportunity to communicate with his or her own bank to provide them the confirmation number.

If a hedge is chosen, the surrendered precious metals are processed and assayed so that the seller understands exactly how many ounces of pure precious metal that he/she has. The processor (e.g., Assay on Wheels®) then takes possession of the metal but does not immediately pay the seller. Rather, the seller then has the option to call the buyer/processor when the price of the surrendered metal reaches a certain price that's acceptable to the seller. The buyer/processor then hedges the metal into the market and pays the seller at that future time.

It is, therefore, an object of the invention to provide a self-contained assay facility in a fixed wing or rotary wing aircraft, the assay facility being completely equipped to melt and assay scrap precious metal or metal rich ore.

It is another object of the invention to provide a self-contained assay facility in a fixed wing or rotary wing aircraft where precious metal or precious metal ore may be melted using an induction or arc furnace powered by either a self-contained generator or a generator powered by the aircraft's engine, the melted metal then being formed into ingots.

It is an additional object of the invention to provide a self-contained assay facility in a fixed wing or rotary wing aircraft where ingots may be accurately assayed and wherein the current market price of gold or another precious metal may be determined so that a value may be immediately calculated for the ingot.

It is a further object of the invention to provide a self-contained assay facility in a fixed wing or rotary wing aircraft where a computer calculates the worth of the seller's precious metal now in ingot form and where the seller may be paid for the precious metal in cash, gold bullion, by a wire transfer initiated and confirmed from the self-contained assay facility, by an open hedge, or by check.

It is a still further object of the invention to provide a self-contained assay facility security, surveillance, and communications system whereby the location, security, and other information concerning the self-contained assay facility in a fixed wing or rotary wing aircraft may be monitored at a location remote thereto.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein:

FIG. 4a is a front, elevational, pictorial, schematic view of a portion of a processing compartment;

FIG. 4b is a right, elevational pictorial, schematic, view of a portion of the processing compartment of FIG. 4a;

FIG. 7 is a screen shot of a typical XRF analysis result;

FIG. 8b is a screen shot of a gold bar payout determination screen of a customer payout workbook;

DETAILED DESCRIPTION OF THE PREFERRED EMBODIMENT

The present invention provides a self-contained assay facility housed in a in a fixed wing or rotary wing aircraft and a method of using the self-contained assay facility.

Figure 1:
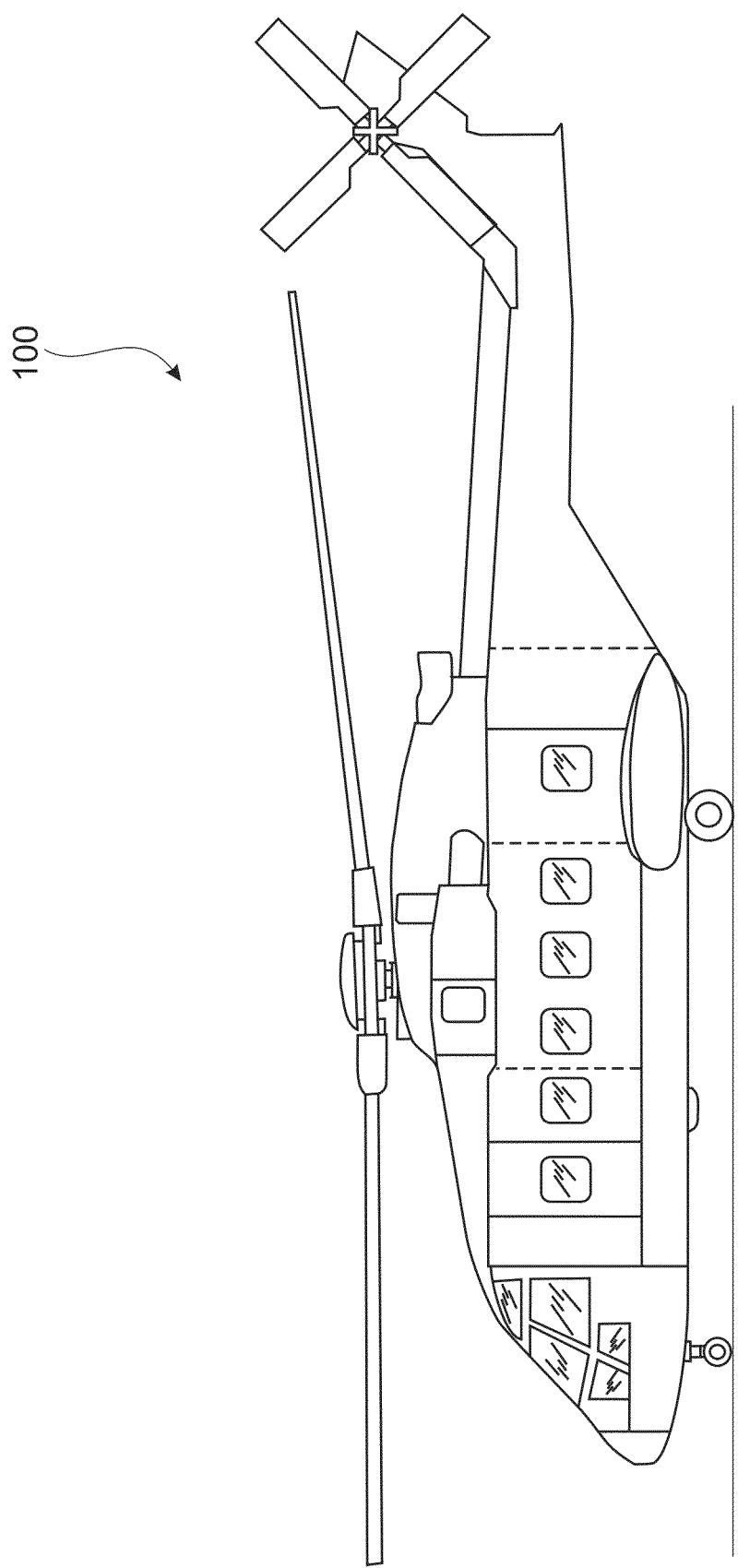
FIG. 1 is a side elevational, schematic view of a typical rotary wing aircraft suitable for use in practicing the invention.

Referring first to FIG. 1, there is shown a side elevational, schematic view of a typical rotary wing aircraft 100 suitable for use in implementing a self-contained assay facility in accordance with one embodiment of the present invention. As previously noted, in alternate embodiments of the invention, the novel self-contained assay facility may be implemented in a fixed wing aircraft. Fixed wing aircraft are believed to be well known and are not further discussed herein.

Figure 2:
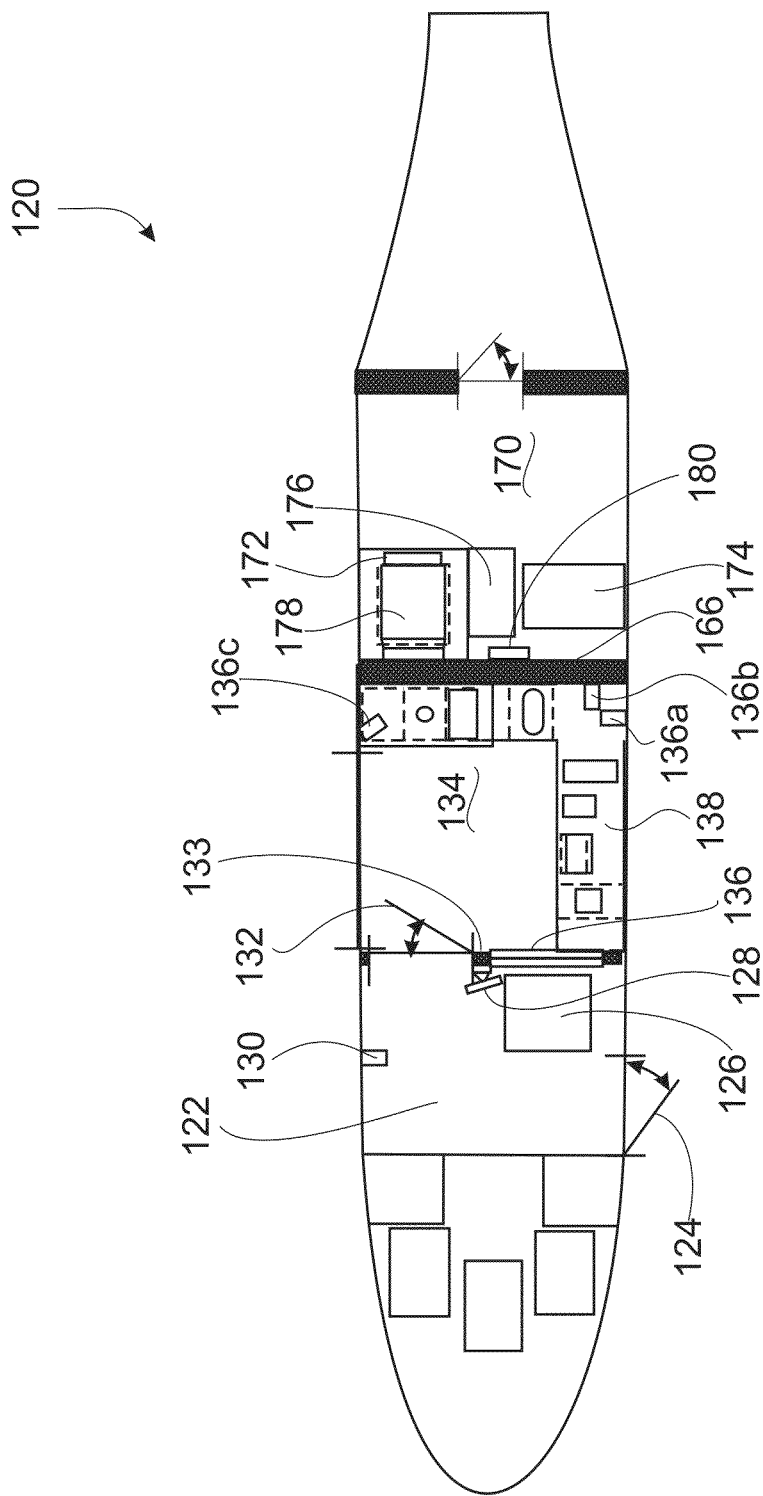
FIG. 2 is a floor plan of the rotary wing aircraft of FIG. 1 when equipped as a self-contained assay facility.

Referring now also to FIG. 2, there is shown a floor plan of a self-contained assay facility 120. A client compartment 122 has an exterior door 124 allowing ingress and egress of to and from client compartment 122 from outside the aircraft 100. The client compartment 122 contains a client chair 126, a client monitor 128, and a client compartment camera 130. Client monitor 128 is operatively connected to one or more cameras 168a, 168b, 168c disposed in a processing compartment 134.

Figure 3:
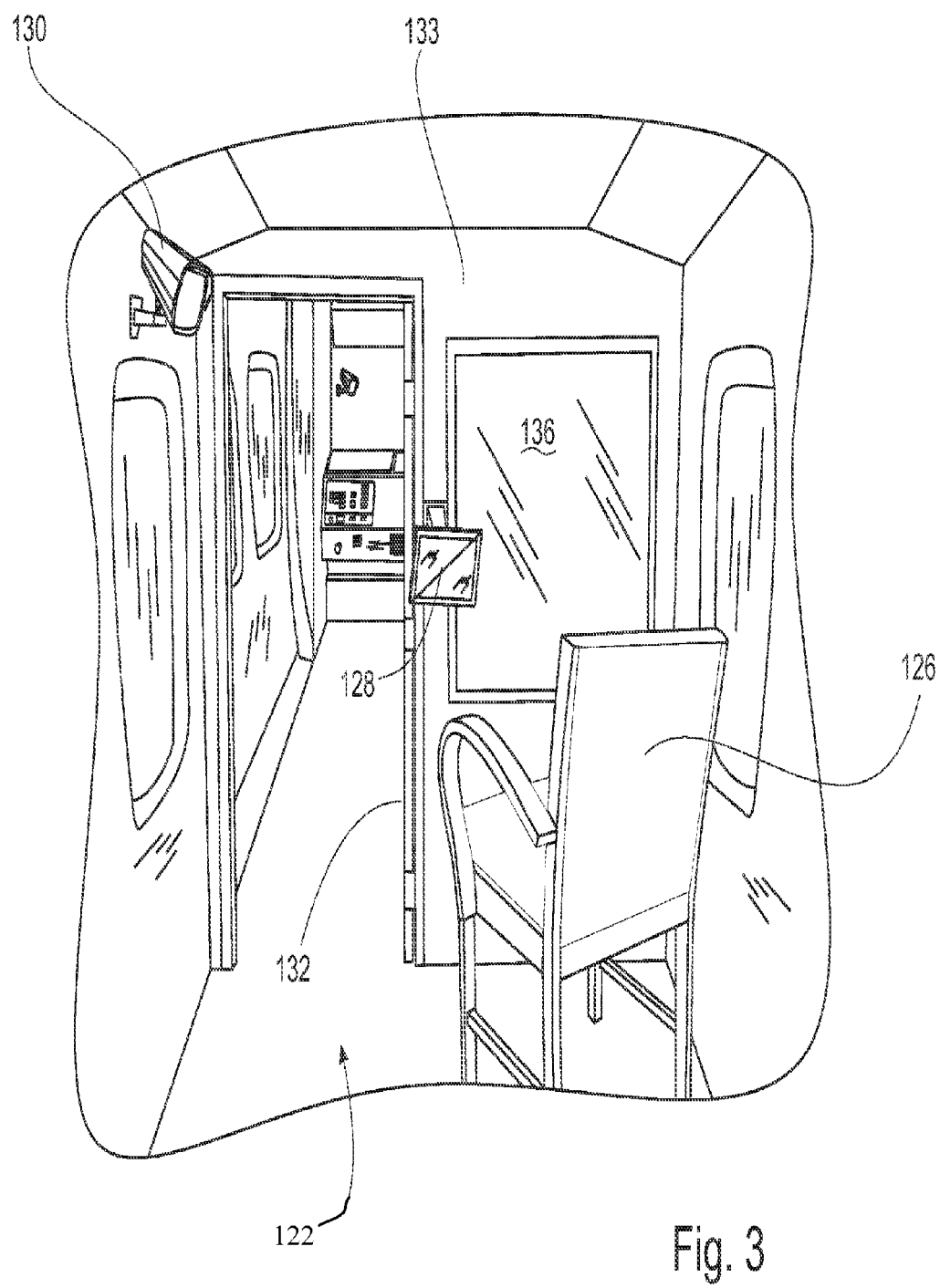
FIG. 3 is a front, elevational, pictorial, schematic view of a client compartment of an aircraft with a portion of a processing compartment visible through a door therebetween.

Referring now also to FIG. 3, there is shown a front, elevational, pictorial, schematic view of a portion of client compartment 122.

An interior door 132 in a partition 133 allows passage between client compartment 122 and the processing compartment 134. A window 136 in partition 133 allows visual communication between client compartment 122 and processing compartment 134.

Processing compartment 134 contains all necessary equipment and tools for melting precious metal or metal bearing ore, pouring ingots, assaying the ingots, and paying a client for any precious metal surrendered.

Referring now also to FIG. 4a, there is shown an elevational, pictorial, schematic view of a portion of processing compartment 134. A work surface 138 is disposed along the left side of processing compartment 134. Work surface 138 supports a cash counting machine 140, a notebook computer 142, a precision scale or balance 144, and an XRF analyzer 146. A printer 152 may be disposed either on work surface 138 or may be disposed in a compartment, not specifically identified, beneath work surface 138.

Cash counter 140 is a commercially available unit believed to be well known to those of skill in the art. Consequently, cash counter 140 is not discussed in greater detail herein. It is assumed that cash counter 140 is either rigidly affixed to work surface 138 or may be stowed in a secure storage compartment during flight.

Also, notebook computer 142 is a standard, commercially available until also well known to those of skill in the art. Notebook computer 142 is operatively connected to at least a precision scale or balance 144, XRF analyzer 146, cash dispenser 150, and printer 152. Notebook computer 142 is typically securely stowed during flight. Various alternate computing devices may be substituted for notebook computer 142. Consequently, the invention is not considered limited to any particular type or form of computing device.

An accurate precision scale or balance, typically a so-called analytical balance 144 is also disposed on work surface 138. An Ohaus Explorer® Pro analytical balance, Model EP6101N manufactured by Ohaus Corporation of Parsippany, N.J. has been found suitable for the application. As with other equipment used within assay facility 120, it will be recognized that other suitable scales or balances may be substituted for the Ohaus Model EP6101N and the invention is intended to include any suitable scale or balance. Like other equipment within aircraft assay facility 120, analytical balance 144 may either be secured to work surface 138 or alternately, stowed securely during flight.

X-ray fluorescence (XRF) alloy analyzer 146 is also placed on work surface 138. XRF analyzer 146 may be a Thermo Scientific Niton® Model XL3t XRF analyzer manufactured by Thermo Fisher Scientific of Billerica, Mass. This model has been found suitable for the application. Typically the Thermo Scientific Niton® Model XL3t analyzer is typically mounted on a stand, not specifically identified, to facilitate use thereof. It will be recognized that other suitable XRF analyzers and/or similar analyzers using different analysis technologies may be substituted for the Thermo Scientific Niton® Model XL3t XRF analyzer 146 chosen for purposes of disclosure. Consequently, the invention is not considered limited to a particular analysis device or technology as any suitable analysis apparatus may be utilized.

XRF analyzer 146 must either be secured to work surface 138 or securely stowed during flight.

A safe 148 is disposed under work surface 138. In some environments, a removable safe 148 may be preferred so that safe 148 may be removed when assay facility 120 is not in use.

Safe 148 typically includes a built-in cash dispenser 150, only a discharge slot being visible in FIG. 4a. Cash dispenser 150 is accessible from the front of safe 148 such that safe 148 need not be opened to dispense cash.

Figure 4B:
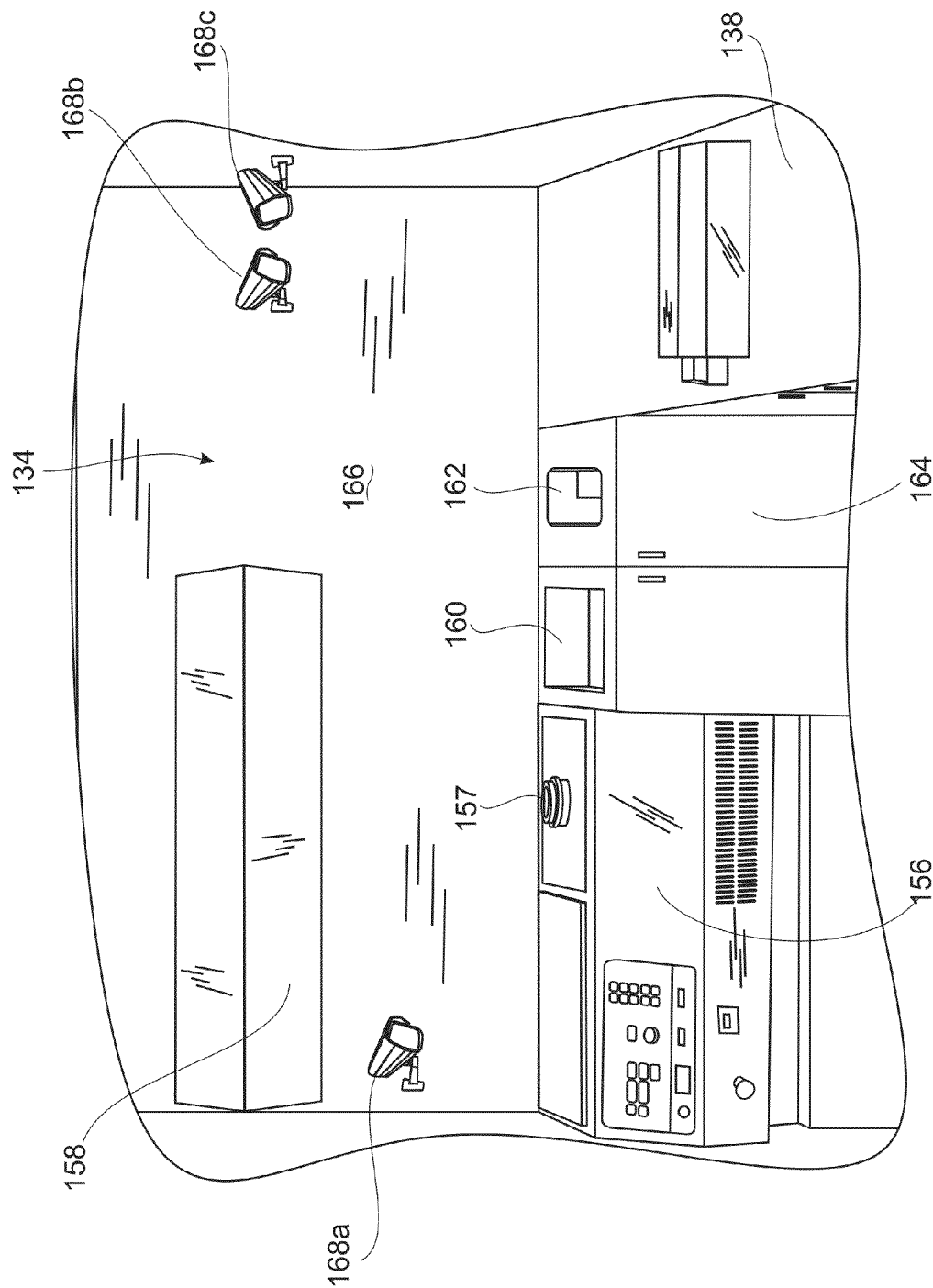

Referring now also to FIG. 4b, there is shown an elevational, pictorial, schematic view of an aft portion of processing compartment 134.

Processing compartment 134 contains an induction furnace 156 having an opening 157 adapted to receive a crucible, not shown, for melting the precious metal or metal bearing ore. An induction furnace exhaust hood 158 is disposed over induction furnace 156. A CEIA Model F5-D/220 induction furnace manufactured by CEIA SpA of Arezzo, Italy has been found suitable for the application. It will be recognized that other similar induction or arc casting furnaces may be known to those of skill in the art, any suitable one of which may be substituted for the CEIA furnace chosen for purposes of disclosure.

A tool holder 160 is located adjacent induction furnace 156 and is configured to retain the tools necessary for accomplishing melting, ingot pouring, etc. during flight.

An ingot quench tank 162 is disposed adjacent tool holder 160.

A storage cabinet 164 may be installed under tool holder 160 and/or quench tank 162.

Cameras 168a, 168b, 168c are disposed on walls of processing compartment 134 and aimed so that all aspects of the melting and assaying operations taking place may readily be displayed on client monitor 128.

Figure 5:
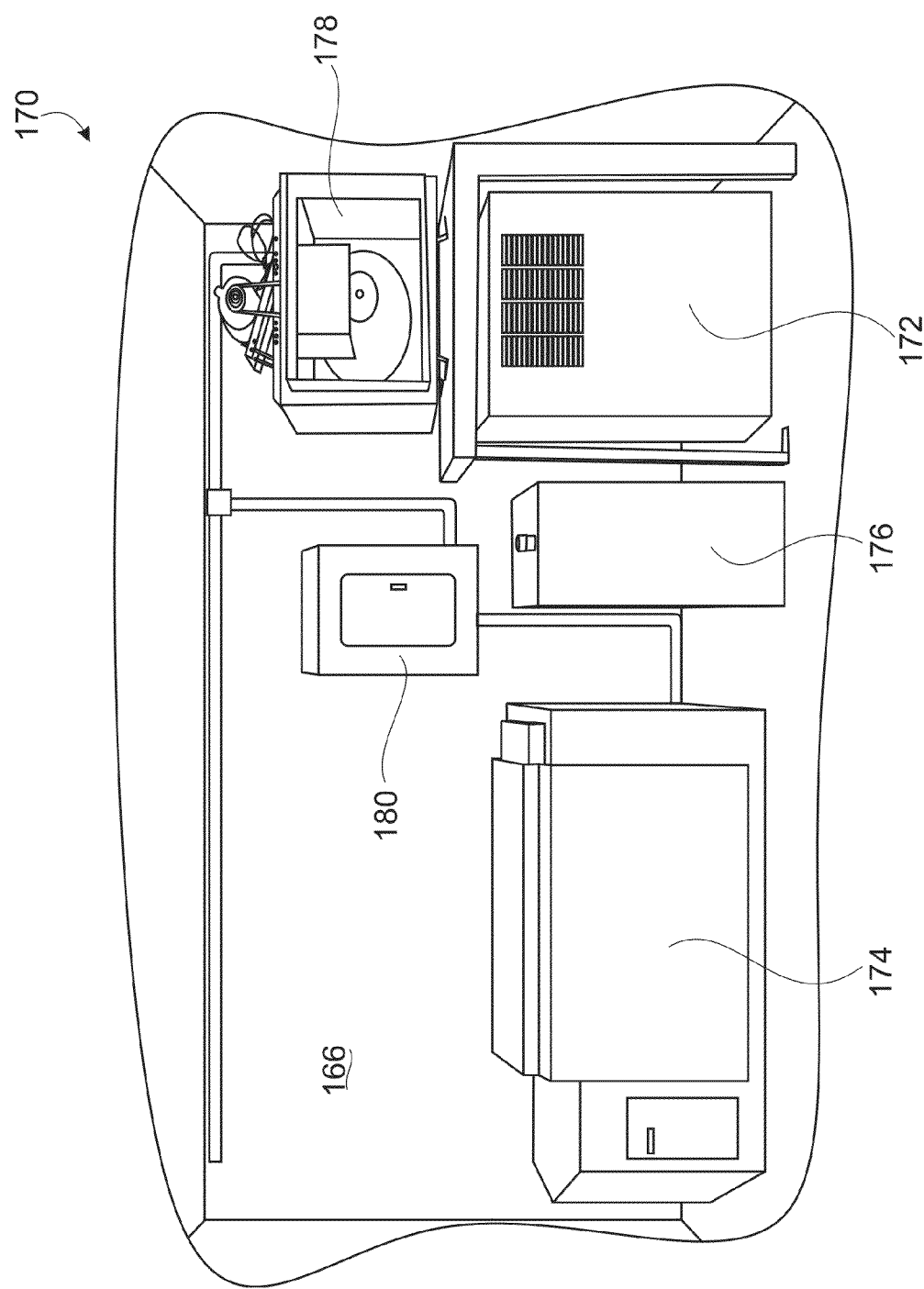
FIG. 5 is a rear, elevational pictorial, schematic view of a utility compartment of the aircraft of FIGS. 1 and 2.

Referring now also to FIG. 5, there is shown a rear, elevational pictorial, schematic view of a utility compartment 170. A partition 166 separates processing compartment 134 from utility compartment 170. Utility compartment 170 is only accessible from outside aircraft 100. An exterior door neither identified nor shown, forming a part of the hull of aircraft 100 may be used for entry to utility compartment 170. Utility compartment 170 contains a chiller 172 that is operatively connected to induction furnace 156 and provides necessary cooling water to induction furnace 156. A Dimplex Thermal Solutions Chiller Model No. JH1000-21-V has been found suitable for the application. The JH1000-21-V chiller is a closed-loop device that incorporates a high pressure recirculating pump with a capacity of approximately 4 gpm at 50 psi and has a ⅛ ton cooling capacity. It will be recognized that other chillers made by other manufactures may be suitable for the application. Consequently, the invention is intended to include any suitable chiller in addition to the Dimplex JH1000-21-V chiller chosen for purposes of disclosure.

Self-contained assay facility 120 may have a self-contained electrical power provided by a generator 174 disposed in utility compartment 170. In alternate embodiments, self-contained assay facility 120 may derive necessary electrical power either from the aircraft's electrical system, not specifically identified, or from an auxiliary generator, not shown, mechanically coupled to the engine, not specifically identified, of aircraft 100.

When included, electrical generator 174 is typically a three-phase, diesel-powered generator that provides approximately 12 kW of electrical power to assay facility 120. While a Kubota Model 10012ENC, Engine type V1505BG has been chosen for purposes of disclosure, it will be recognized that other similar generators available from other manufacturers may be substituted. Consequently, the invention is not considered limited to a particular make or model of generator. Rather, the invention is intended to include any suitable generator.

An external fuel supply tank 176 is used to provide fuel for generator 174.

The second major component in utility compartment 170 is exhaust system 178. Exhaust system 178 includes an approximately 3500 cfm blower system to draw fumes from induction furnace exhaust hood 158. The exhaust system 178 is sized to allow a complete air replacement in the client compartment 122 and processing compartment 134 approximately every 17.5 seconds and typically contains a HEPA filter, not specifically identified. The HEPA filter removes most of the particles from the air being exhausted from inside assay facility 120, typically approximately 99.9% of particles greater than 0.3 microns.

Also located in utility compartment 170 is an electrical panel 180 that controls power to all power consuming apparatus in assay facility 120, notably induction furnace 156 and chiller 172.

As described in at least one of the included-by-reference '163, '422, and '811 applications, one or more outside security cameras, not specifically identified, may be used to monitor all activity outside aircraft 100. Images from external security cameras(s) may be recorded and stored locally or may be periodically uploaded via a satellite phone communications system. Images may be recorded and stored on notebook computer 142 using "DVR" software well known to those of skill in the art. Notebook computer 142 may also contain other security system elements and controls.

Aircraft 100 may also include a variety of security alarm inputs including but not limited to motion sensors, pressure sensors, vibration sensors, glass breakage sensors, safe intrusion sensors, sound sensors, fire sensors, power failure sensors, panic buttons, or any other known sensor or input, none of which are specifically identified may be connected to notebook computer 142. When an alarm condition is sensed, the assayer is alerted using a Satellite phone communications system. The security system forms a so-called silent alarm where no local audible or visual annunciators are provided or used. However, it will be recognized that such local annunciators may be provided and used when required in specific installations.

Other items possibly housed in utility compartment 170 may be a water tank, shelves or cabinets, housing for electronic communication and/or security equipment, none of which are specifically identified.

A provision is included for introducing compressed air into any plumbing to purge all lines when necessary so that damage due to freezing is eliminated. A compressor, not shown, compressed air from aircraft 100, or a compressed air tank, not shown, may supply compressed air for purging of the plumbing.

In operation, two operating modes are anticipated. In a first operating mode, all assaying and settlement takes place where aircraft 100 is stationery on the ground. In a second mode of operation, precious metal and precious metal bearing ore are received for assay. Once received, the aircraft takes off and the melting and assaying processes are conducted with aircraft 100 is airborne.

In the first mode of operation, all equipment may be stowed for flight and unpacked and set up when the aircraft 100 reaches a desired destination where precious metal is to be melted and assayed. In the second mode of operation, all equipment must be securely attached to appropriate structures and, if necessary, instruments such as precision scale or balance must be sufficiently vibration isolated to ensure accurate performance during flight.

In the first mode of operation, self-contained assay facility 120 is flown to a desired location and landed on a relatively level location. In this mode of operation, once the aircraft has landed and is in a stable position, any equipment packed for flight is unpacked and set up.

Any external features such as security cameras, not shown, are placed outside aircraft 100.

If necessary, diesel fuel is added to storage tank 176.

Once generator 174 is started, operation of self-contained assay facility 120 may begin.

Figure 6A:
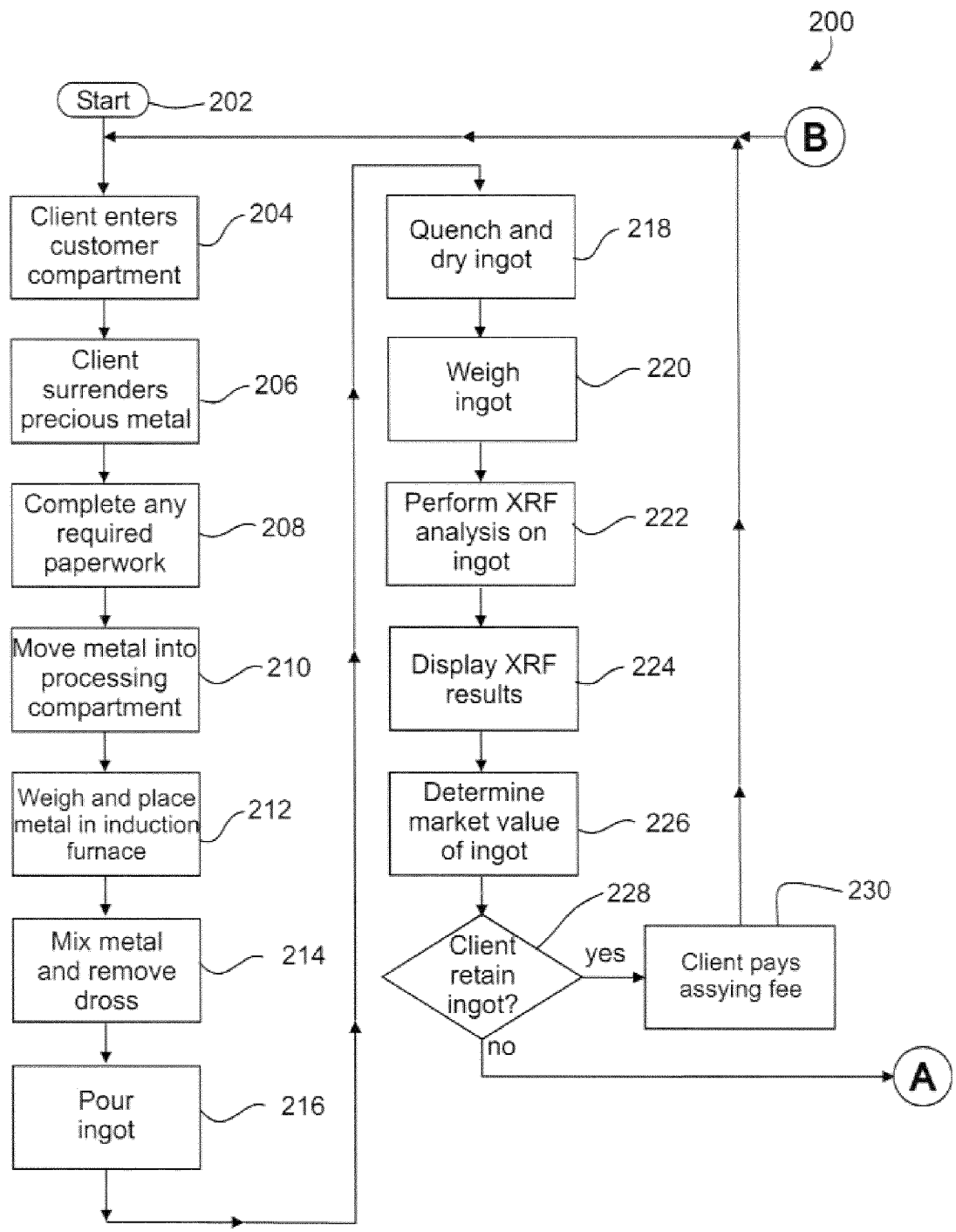
FIGS. 6a and 6b when taken together form a simplified flowchart of the operation of the transportable, self-contained assay facility in accordance with the invention.
Figure 6B:
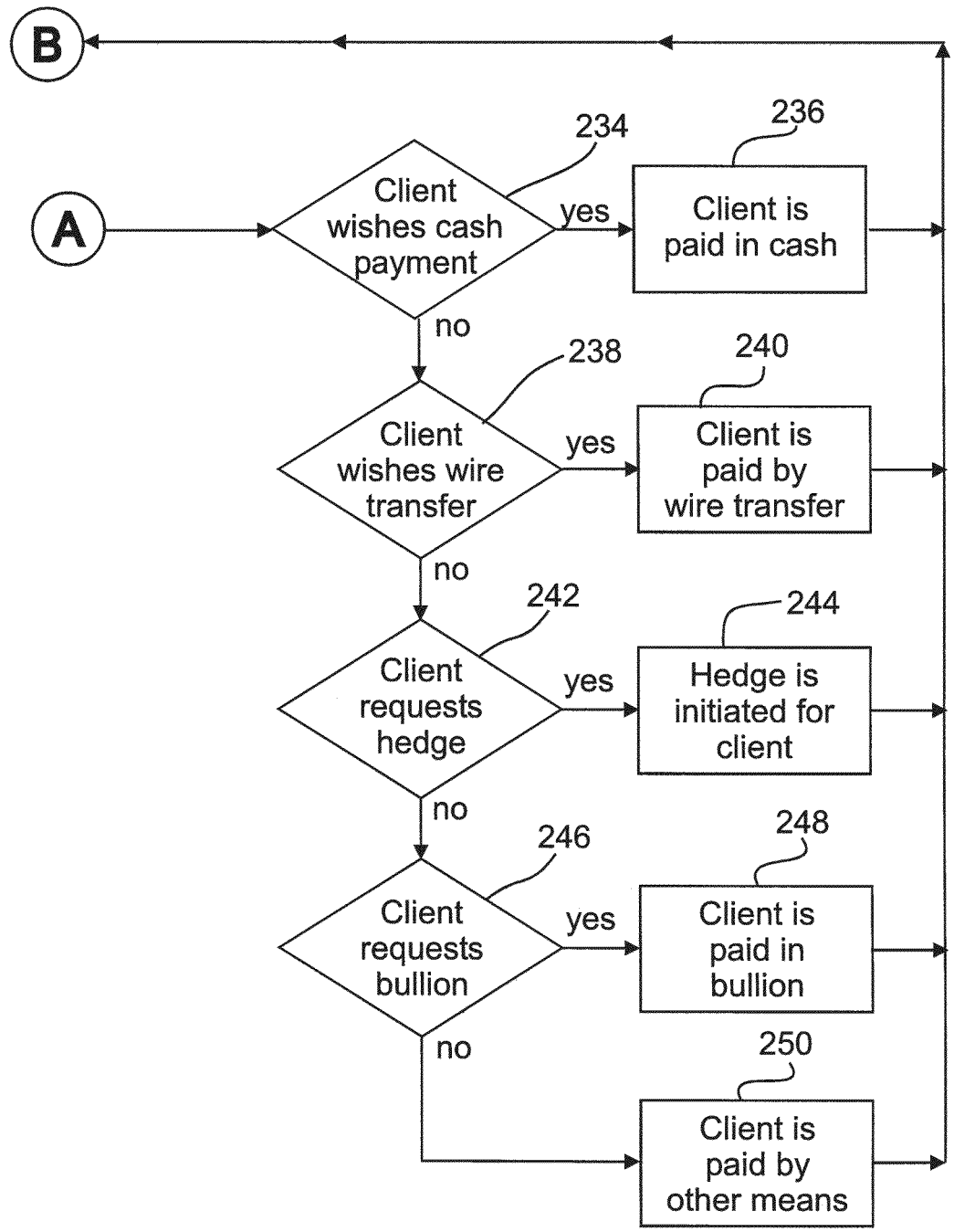

Referring now to FIGS. 6*a* and 6*b* there is collectively shown a flow chart of the assay process using the self-contained assay facility in an aircraft in accordance with the invention, generally at reference number 200.

The process starts, block 202. A client wishing to have precious metal or metal rich ore smelted and assayed brings such precious metal or metal rich ore to the facility where the client enters the client compartment 122, block 204 and surrenders his/her precious metal to an assay technician, block 206.

When required any necessary paper work for compliance with 13 C.F.R. §103.140 or other anti money laundering statutes must be completed, block 208.

The surrendered precious metal is weighed using precision scale 144, step not shown.

The assay technician moves the surrendered precious metal into processing compartment, block 210 and, after weighing the metal, places material to be melted/smelted into a crucible that is then placed into induction furnace 156, block 212 while client watches from client compartment 122 through window 136 and/or on client video monitor 128. It is assumed that induction furnace 156 has been started and allowed to reach a desired melting temperature, generally approximately 2000° F. Precious metal is generally added to the crucible in small amounts. The melted precious metal mix is periodically stirred to obtain a uniform mixture of the component metals of the batch, block 214 and unmelted metals such as Platinum (Pt) are removed from the melt as is dross, block 214.

When the melt is at an appropriate temperature, considered to be uniform, and is free from dross, the crucible is removed from induction furnace 156 and the contents are poured into an ingot mold of an appropriate size, block 216.

Once the poured ingot has cooled sufficiently for safe handling, the ingot is removed from the ingot mold and placed into ingot quench tank 162 for rapid cooling, block 218.

When cool, the ingot is removed from ingot quench tank 162. The ingot is then dried, block 218.

Once dried, the ingot is then weighed using precision scale 144, block 220. After weighing, the ingot is scanned by XRF analyzer 146, block 222 and the results of the X-ray analysis recorded and displayed, block 224. A screen shot of a typical analysis result is shown in FIG. 7. As may readily be seen, the percentage and a two sigma value for various component metals of the ingot are displayed. In the example shown in FIG. 7, gold (Au) forms 59.66 with a 2σ value of 0.88. Likewise, the percentage of Silver (Ag), Palladium (Pd), Platinum (Pt), Zinc (Zn) and copper (Cu) are displayed.

The current market value of the ingot is next determined, block 226. The market value of ingot depends on the market value of one or more selected component precious metals (e.g., gold, silver, etc.). The value of the selected precious metal(s) (e.g., gold, silver, etc.) is calculated by multiplying the current market value of each selected metal by the percentage of that metal (obtained by the XRF analysis) in the ingot multiplied by the total weight of the ingot. Weights are typically expressed in ounces although it will be recognized that other units of measure, for example, grams may be used for such calculations. The current market value of the selected precious metal(s) is determined typically using computer 142 connected to a metal exchange or wholesale metal broker using the facility's communications system.

Once the market value of the precious metal is known, a client payout for the ingot may be calculated.

Figure 8A:
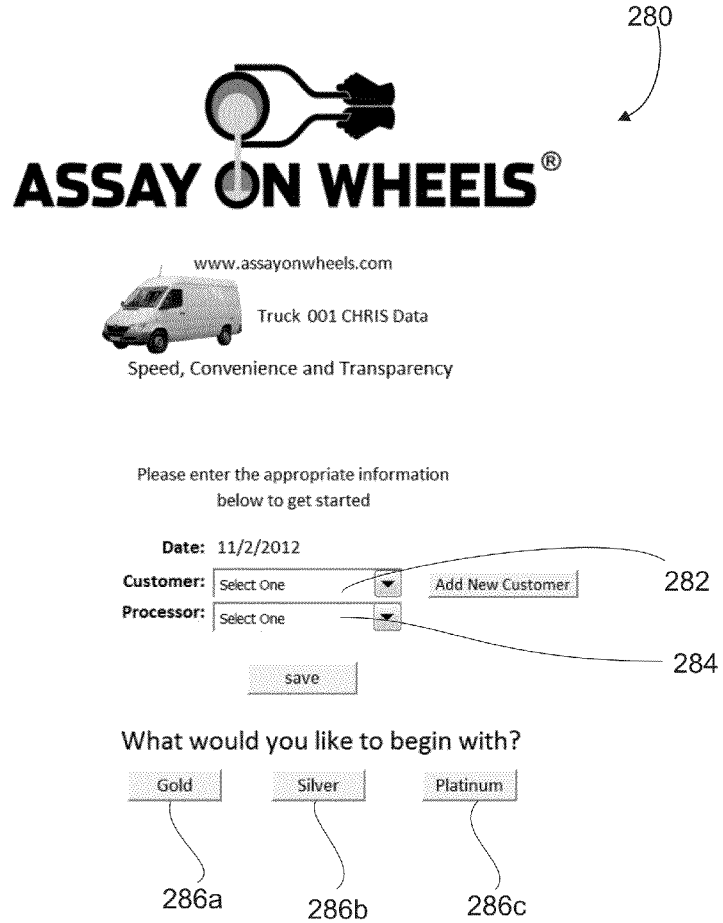
FIG. 8a is screen shot of a "welcome" screen of a "customer payout workbook" used to determine the payout to a client in accordance with the method of the invention.

Customer payout is calculated using a series of spread sheets or other similar programs, not shown, forming a "customer workbook" in computer 142. Referring now also to FIG. 8*a*, there is shown a welcome screen 280 that allows the assay technician, not shown, to enter preliminary identification information. This information includes a customer identification 282 and a processor (i.e., assay technician) 284.

Once the preliminary information is entered, the "Save" button is selected and the template is saved as a unique file name before choosing metal type. The assay technician then selects the particular precious metal with which to begin, buttons 286*a*, 286*b*, 286*c*. In the implementation chosen for purposes of disclosure, gold (button 286*a*), silver (button 286*b*), and platinum (button 286*c*) are shown. It will be recognized that one or more of precious metals gold, silver, and platinum may be removed. Other precious metals may be added. Consequently, the invention is not considered limited to the particular precious metal chosen for purposes of disclosure. The invention is intended to include any combination of precious metals.

Figure 8C:
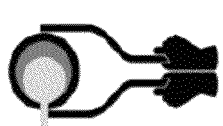
FIG. 8c is a screen shout of gold bar hedge payout screen of a customer payout workbook.
Figure 8D:
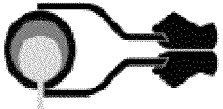
FIG. 8d is a screen shot of a "Totals" screen of a customer payout workbook.

A variety of different screens, (e.g., spreadsheets, etc) are provided to calculate customer payout for various precious metals or combinations thereof, different payout options, and for multiple assayed bars. Only three of such payout screens are shown. Referring now also to FIG. 8b, there is shown a payout calculation screen 290 for a single gold bar. FIG. 8c shows a payout calculation screen 320 for establishing an open hedge for one or more gold bars. FIG. 8d shows a totals screen 350 for determining a total customer payout for multiple bars and/or multiple precious metals. They are chosen as representative of any number of possible of payout screens in a customer payout workbook. It will be recognized to those of skill in the art that numerous other payout screen may be provided to meet particular operating circumstances or environments. Consequently, the invention is not considered limited to the customer payout screens 280, 290, 320, and 350 chosen for purposes of disclosure. Rather, the invention is intended to include any and all additional customer payout screens useful for use in assay facility in accordance with the method of the invention.

As shown in FIG. 8b, the assay technician is next provided with a customer payout screen 290 because the selected precious metal is gold and button 286a (FIG. 8a) was selected. Other similar screens, not shown, could be provided for silver (button 286b) or platinum (button 286c).

On customer payout sheet 290 a series of X-ray results, not specifically identified, are shown. Values for these X-ray fields are automatically provided to computer 142 by XRF analyzer 146 when the particular gold bar was assayed.

The percent (%) purity value resulting from the X-ray analysis, block 222 has also been transferred to customer payout sheet 290 and shown at reference number 292. The total ounces of pure gold 296 is calculated by converting (when necessary) the bar or ingot weight in grams 294 to ounces and multiplying by the % pure, 292. These calculations are typically performed by computer 142.

The market price of gold obtained at block 226 is also transferred to form customer payout form 290 at reference number 298.

A total amount 300 is obtained by multiplying the total ounces of gold 296 by the current market price 298.

A payout percentage 302 is selected from a pull-down menu and a total payout 304 is calculated from total amount 300 multiplied by payout percentage 302.

A processing 306 fee selected from another pull-down menu and subtracted from payout total 304 Processing fee 306 is subtracted from the payout total 304.

Shipping cost, if any, 308 is also subtracted from payout total 304.

After subtraction of processing fee 306 and shipping fee 308 from payout total 304, the net customer payout 310 remains.

There are several ways in which the client may be paid for the ingot. One way is to simply return the ingot to the client. If the client wishes to retain the assayed ingot, block 228, the client may be charged a processing fee for the assays, block 230. Once the processing fee is collected, either in cash, by credit card, or by another arrangement, block 230, the ingot is returned to the client. A client payout form 280 (FIG. 8a) may be printed and given to the client. The client then typically leaves and control is transferred to block 202.

If the client wishes to surrender the ingot, block 228, the payment form is agreed upon. If the client requests cash, block 234, the assay technician collects the necessary cash payment from cash dispenser 150 housed in safe 148, typically disposed in processing compartment 134. The technician then places the ingot in the safe 148, block 236. Once the client is paid, he or she typically leaves and control is returned to start, block 202.

If however, the client does not want a cash payment, block 234, the client may request a wire transfer, block 238. If the client wishes to be paid by wire transfer, block 238, a wire transfer is initiated, block 240. Typically, a client does not leave assay facility 120 until a verification of the wire transfer, including a confirmation number, is received and provided to the client. Once the client is satisfied that the wire transfer has been successfully initiated, block 240, he or she typically leaves and control is returned to block 202. The retained ingot is typically placed in the safe 148.

If the client wishes neither a cash payment nor a wire transfer, he or she may opt that a market hedge be established, block 242. If the client requests a hedge, a hedge is initiated for the client, block 244. Referring now also to FIG. 8c, there is shown a client payout screen 320 showing the initiation of a hedge. Up to three gold bars 322, 324, 326 may be processed. Once the client has read the acknowledgement paragraph, the processor signs the form 328. The client then provides a printed name 330 and a signature 332. If a Patriot Act compliance officer's signature is required, that signature 334 is also supplied. Once the hedge is initiated, the client typically leaves and control is transferred to block 202. The retained ingot is typically placed in the safe 148.

If, however, the client does not opt for a hedge, block 242, the client may wish to be paid in bullion, block 246. If the client requests a payment in bullion, block 246, the assay technician removes the required amount of bullion from the safe 148, block 248, and pays the client. Once the client is paid, he or she typically leaves and control is returned to block 202. The retained ingot is typically placed in the safe 148.

If the client has not opted for payment in cash, block 234, wire transfer, block 238, a market hedge, block 242, or bullion, block 246, the client may be paid by check or in some other mutually acceptable manner, block 250. The retained ingot is typically placed in the safe 148. The client typically then leaves and control is transferred to block 202.

Referring now also to FIG. 8d, there is shown a client payout totals screen 350. Totals screen 350 is useful for complex transactions relating to multiple precious metals and especially multiple ingots (i.e., bars), or split (i.e., payment paid in more than one manner) payout methods are to be made.

Information from other customer payout screens may be summarized on totals screen 350. Multiple bars 360, each potentially having more than one precious metal are enumerated in columns 352 (gold), 354 (silver), and 356 (platinum) with the total dollar amount(s) associated with each bar tallied on respective lines in column 358.

If there is a wire transfer fee 362 associated with the client transaction, the fee is subtracted from the sum of the dollars column 358 and the total less the wire transfer fee is shown as total payment 364.

As previously described, the processor signature 328, the client's printed name 330, the clients signature 332, and, when required, a Patriot Act compliance officer's signature 334 are gathered on the form resulting from customer payout totals screen 350.

If the client has surrendered the ingot, it will typically be put into safe 148. Periodically, for example, at the end of a day, the accumulated ingots may be shipped via a secure carrier to a processing facility, not shown. As the assay facility is contained within an aircraft, the aircraft may fly directly to a processing facility where any ingots may be unloaded from safe 148 and delivered directly to the processing facility.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A self-contained assay facility in a fixed wing or rotary wing aircraft, comprising:
   a) an aircraft suitable for containing all tools and equipment required to melt/smelt and assay precious metals, said aircraft being adapted to allow a seller of precious metals to observe the melting and assaying processes;
   b) a scale disposed within said aircraft and positioned within view of said seller, said scale being adapted to output a signal representative of a weight of an object weighed thereupon;
   c) a furnace disposed in said aircraft adapted to melt/smelt precious metal received from said seller, said furnace disposed within view of said seller and adapted to melt said precious metal to produce an ingot;
   d) an X-ray fluorescence (XRF) alloy analyzer disposed in said aircraft within view of said seller and adapted to analyze said melted ingot and to record and display the results of an analysis thereof;
   e) means for determining a current market price of at least one precious metal present in said ingot, said means for determining being disposed proximate said aircraft;
   f) a computer disposed within said aircraft and adapted to receive at least said signal representative of a weight of an object weighed received from said scale, an output recorded by said XRF analyzer, said determined current market price of said particular precious metal of interest and adapted to perform at least a calculation of the market value of said precious metal component of said ingot; and
   g) a printer disposed within said aircraft and operatively connected to said computer and adapted to print at least the result of said calculation.

2. The self-contained assay facility in a fixed wing or rotary wing aircraft as recited in claim 1, wherein said aircraft comprises at least three compartments therewithin, said at least three compartments being associated with said assay facility and separated one from another.

3. The self-contained assay facility in a fixed wing or rotary wing aircraft as recited in claim 2, wherein said at least three compartments comprise: a client compartment, a processing compartment, and a utility compartment.

4. The transportable, self-contained assay facility as recited in claim 3, wherein said furnace comprises:
   i) at least one selected from the group: an induction furnace, and an arc furnace, said selected furnace being disposed in said processing compartment;
   ii) a chiller disposed in said utility compartment and operatively connected to said induction furnace; and
   iii) an exhaust hood disposed adjacent said induction furnace and adapted to remove fumes generated by said induction furnace from within at least said processing compartment.

5. The self-contained assay facility in a fixed wing or rotary wing aircraft as recited in claim 4, further comprising:
   h) a source of electrical power operatively connected to at least said induction furnace and said chiller.

6. The self-contained assay facility in a fixed wing or rotary wing aircraft as recited in claim 5, wherein said source of electrical power comprises at least one chosen from the group: a self contained generator disposed in said utility compartment, and an electrical generator operatively connected to an engine associated with said aircraft.

7. The self-contained assay facility in a fixed wing or rotary wing aircraft as recited in claim 6, wherein said self-contained electrical generator comprises a three-phase, diesel powered electrical generator.

8. The self-contained assay facility in a fixed wing or rotary wing aircraft as recited in claim 3, further comprising:
   h) an ingot quenching tank disposed proximate said induction furnace within said processing compartment of said aircraft.

9. The self-contained assay facility in a fixed wing or rotary wing aircraft as recited in claim 3, further comprising:
   h) a safe disposed within said aircraft and adapted to receive at least said ingot.

10. The self-contained assay facility in a fixed wing or rotary wing aircraft as recited in claim 3, wherein said computer is of a type selected from the group: laptop computer, notebook computer, netbook computer, tablet computer, and other portable computer system.

11. The self-contained assay facility in a fixed wing or rotary wing aircraft as recited in claim 3, wherein said aircraft adapted to allow a seller of precious metals to observe the melting and assaying processes further comprises at least one selected from the group: a window between said client compartment and said processing compartment, and a video monitoring system having at least one camera disposed in said processing compartment and a monitor disposed in said client compartment.

12. The self-contained assay facility in a fixed wing or rotary wing aircraft as recited in claim 3, further comprising:
   h) a source of compressed air selected from the group: an air compressor disposed in said utility compartment, a tank of compressed air disposed in said aircraft, and a connection to a source of compressed air associated with said aircraft.

13. The self-contained assay facility in a fixed wing or rotary wing aircraft as recited in claim 2, further comprising:
   h) a communications system disposed in said aircraft for establishing and maintaining at least digital communication with a location remote from said aircraft and for providing Internet access to said self-contained assay facility.

14. The self-contained assay facility in a fixed wing or rotary wing aircraft as recited in claim 1, wherein said scale comprises one selected from the group: a precision balance, and an analytical balance.

15. The self-contained assay facility in a fixed wing or rotary wing aircraft as recited in claim 1, further comprising:
   h) a security and surveillance system disposed in and around said aircraft, said security and surveillance system comprising:
      i) at least one camera disposed at a location selected from the group: inside said client compartment, inside said processing compartment, and outside said aircraft;
      ii) a monitor disposed inside said aircraft operatively connected to display an image from said at least one camera;
      iii) a digital video recorder operatively connected to and adapted to record an image from said at least one camera;
      iv) a communications link operatively connected to at least one of said at least one camera and said digital video camera operatively connected to each thereof and adapted to transmit at least an image therefrom to a receiver at a location remote from said aircraft.

16. The self-contained assay facility in a fixed wing or rotary wing aircraft as recited in claim 15, wherein said security and surveillance system further comprises:
- v) at least one alarm input selected from the group: motion sensors, pressure sensors, vibration sensors, glass breakage sensors, safe intrusion sensors, sound sensors, fire sensors, power failure sensors, panic buttons, other alarm sensors; and
- vi) at least one local annunciator selected from the group: bells, sirens, lights, or other annunciating devices.

* * * * *